(12) United States Patent
Hernandez et al.

(10) Patent No.: US 8,046,641 B2
(45) Date of Patent: Oct. 25, 2011

(54) MANAGING PAGING I/O ERRORS DURING HYPERVISOR PAGE FAULT PROCESSING

(75) Inventors: Carol B. Hernandez, Austin, TX (US);
David A. Larson, Rochester, MN (US);
Naresh Nayar, Rochester, MN (US);
John T. O'Quin, II, Austin, TX (US);
Gary R. Ricard, Chatfield, MN (US);
Kenneth C. Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 12/478,990

(22) Filed: Jun. 5, 2009

(65) Prior Publication Data
US 2009/0307538 A1 Dec. 10, 2009

Related U.S. Application Data

(60) Provisional application No. 61/059,492, filed on Jun. 6, 2008.

(51) Int. Cl.
*G06F 11/00* (2006.01)
(52) U.S. Cl. .......................... 714/54; 714/42
(58) Field of Classification Search ............... 714/5, 29, 714/28, 42, 54, 5.1; 711/148, 173, 206, 208, 711/209; 719/104; 718/104
See application file for complete search history.

(56) References Cited

U.S. PATENT DOCUMENTS

| | | | |
|---|---|---|---|
| 7,305,592 B2 * | 12/2007 | Neiger et al. | 714/48 |
| 7,337,296 B2 * | 2/2008 | Noel et al. | 711/206 |
| 7,702,843 B1 * | 4/2010 | Chen et al. | 711/6 |
| 2005/0132249 A1 * | 6/2005 | Burton et al. | 714/5 |
| 2006/0195673 A1 * | 8/2006 | Arndt et al. | 711/173 |

* cited by examiner

*Primary Examiner* — Robert Beausoliel, Jr.
*Assistant Examiner* — Joseph D Manoskey
(74) *Attorney, Agent, or Firm* — Matthew C. Zehrer; James R. Nock

(57) ABSTRACT

In response to a hypervisor page fault for memory that is not resident in a shared memory pool, an I/O paging request is sent to an external storage paging space. In response to a paging service partition encountering an I/O paging error, a paging failure indication is sent to the hypervisor. A simulated machine check interrupt instruction is sent from the hypervisor to the shared memory partition and a machine check handler obtains control. The machine check handler performs data analysis utilizing an error log in an attempt to isolate the I/O paging error to a process or a set of processes in the shared memory partition. The process or set of processes associated with the I/O paging error, or the shared memory partition itself, may be terminated. Finally, the shared memory partition may clear or initialize the page associated with the I/O paging error.

14 Claims, 11 Drawing Sheets

MANAGING PAGING I/O ERRORS DURING HYPERVISOR PAGE FAULT PROCESSING

CROSS-REFERENCE TO RELATED APPLICATION

This application claims the benefit of U.S. provisional application Ser. No. 61/059,492, filed Jun. 6, 2008, entitled "Virtual Real Memory", the entirety of which is incorporated herein by reference.

TECHNICAL FIELD

The present invention relates generally to data processing systems, and more particularly, to handling I/O paging errors in the hypervisor-managed paging environment of a shared memory partition data processing system.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This offloading of higher-level function avoids complex code in the hypervisor, and thus, assists in maintaining the hypervisor to be small and secure within the data processing system.

Currently, the number of logical partitions (LPARs) that may be created on a partitionable server of the data processing system is bound by the amount of real memory available on that server. That is, if the server has 32 GBs of real memory, once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory should be available to the operating system(s) to handle sudden increases in workload requirements.

SUMMARY OF THE INVENTION

A shared memory partition's memory is backed by a pool of physical memory shared by other shared memory partitions on that server. The amount of physical memory in the pool will typically be smaller than the sum of the logical memory assigned to all of the shared memory partitions in the pool to allow the memory to be more fully utilized. Idle and/or less active logical memory in the shared partitions that does not fit in the physical memory pool is paged out by the hypervisor to a cheaper and more abundant form of storage via an entity external to the hypervisor known as a paging service partition. In order for the shared memory partition to utilize the requested page, the hypervisor issues a page-in request to paging service partition to move the requested page from the cheaper and more abundant form of storage (i.e., the paging space, etc.) to the shared memory pool. During the paging-in process various I/O paging errors may occur.

In response to the paging service partition encountering an I/O paging error when attempting to read from the paging space, a paging failure indication is sent to the hypervisor. A simulated machine check interrupt instruction is sent from the hypervisor to the shared memory partition. A machine check handler associated with the shared memory partition obtains control and the virtual processor in the wait state is allowed to begin executing at the machine check handler. The hypervisor generates and provides an error log from the hypervisor to the machine check handler. The machine check handler performs data analysis utilizing the error log in an attempt to isolate the I/O paging error to a process or a set of processes in the shared memory partition associated with the I/O paging error. The process or set of processes in the shared memory partition associated with the I/O paging error may then be terminated. The shared memory partition may also be terminated if for instance, the I/O paging error impacts a kernel associated with the partition. The shared memory partition may clear or initialize the page associated with the I/O paging error.

In another embodiment, a shared memory partition data processing system is described. The shared memory partition data processing system includes a physical memory comprising a shared memory pool for one or more shared memory partitions of the data processing system, and a processor supporting a plurality of virtual processors of the one or more shared memory partitions. The one or more shared memory partitions share at least one portion of the shared memory pool of the physical memory of the data processing system, and interface therewith through a hypervisor memory manager that is or is apart of the hypervisor. A paging service partition facilitates paging-in of memory pages from the paging space to the shared memory pool. In certain embodiments, the hypervisor memory manager, responsive to the paging service partition encountering an I/O paging error when attempting to read from the paging space, receives a paging failure indication from the paging service partition.

In a further embodiment, an article of manufacture is described and includes at least one computer-readable medium having computer-readable program code logic to address a hypervisor page fault in a shared memory partition data processing system. The computer-readable program code logic when executing on a processor performs the following: Responsive to a paging service partition encountering an I/O paging error when attempting to read from a paging space, sending a paging failure indication to a hypervisor that is connected to a shared memory partition and to a paging service partition.

In another embodiment logic for handling hypervisor page faults during shared memory partition migration between data processing systems is described. A shared memory partition migration occurs between two data processing systems. An I/O paging error occurs and the hypervisor memory manager of the source system creates and sends a partition state record to the target system. The partition state record sent to the target system may be in place of the page state record that would typically been sent had the I/O paging error not occurred. The target system logs the pages for which it has received partition state records. The shared memory partition in the target system attempts to access the page associated with the I/O paging error and/or for which the target system has received partition state records.

In another embodiment alternative logic for handling hypervisor page faults during shared memory partition migration within a shared memory partition data processing system is described. The hypervisor memory manager in the target system sends the shared memory partition in the target system attempting to access the page associated with the I/O paging error and/or for which the target system has received partition state records a simulated machine check interrupt response. The hypervisor memory manager in the target system passes control to the shared memory partition's machine check handler. The virtual processor in the shared memory partition in the target system begins executing at machine check handler. The hypervisor memory manager in the target system generates and provides an error log to machine check handler. The machine check handler in the target system performs data analysis. The hypervisor memory manager in the target system calls the shared memory partition to clear or initialize the page that was afflicted with the I/O paging error or the page for which the target system had received the partition state record.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
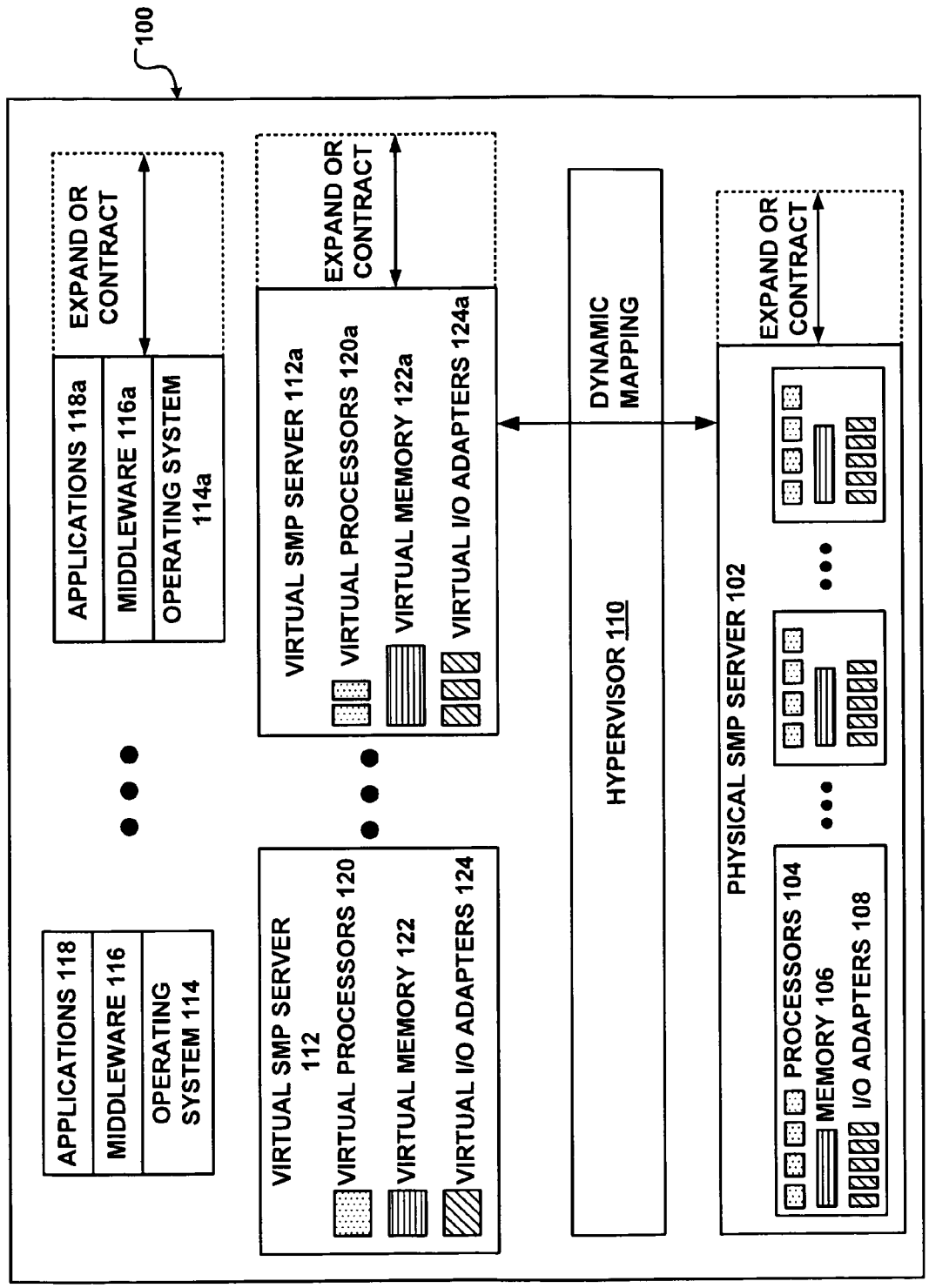
FIG. 1 is a block diagram of a data processing system to implement one or more embodiments of the present invention.

FIG. 1 is a block diagram of a data processing system 100, which in one example, is a symmetric multiprocessing (SMP) server computer system. SMP server computer system 100 includes physical hardware devices that can be mapped to; i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating and managing virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
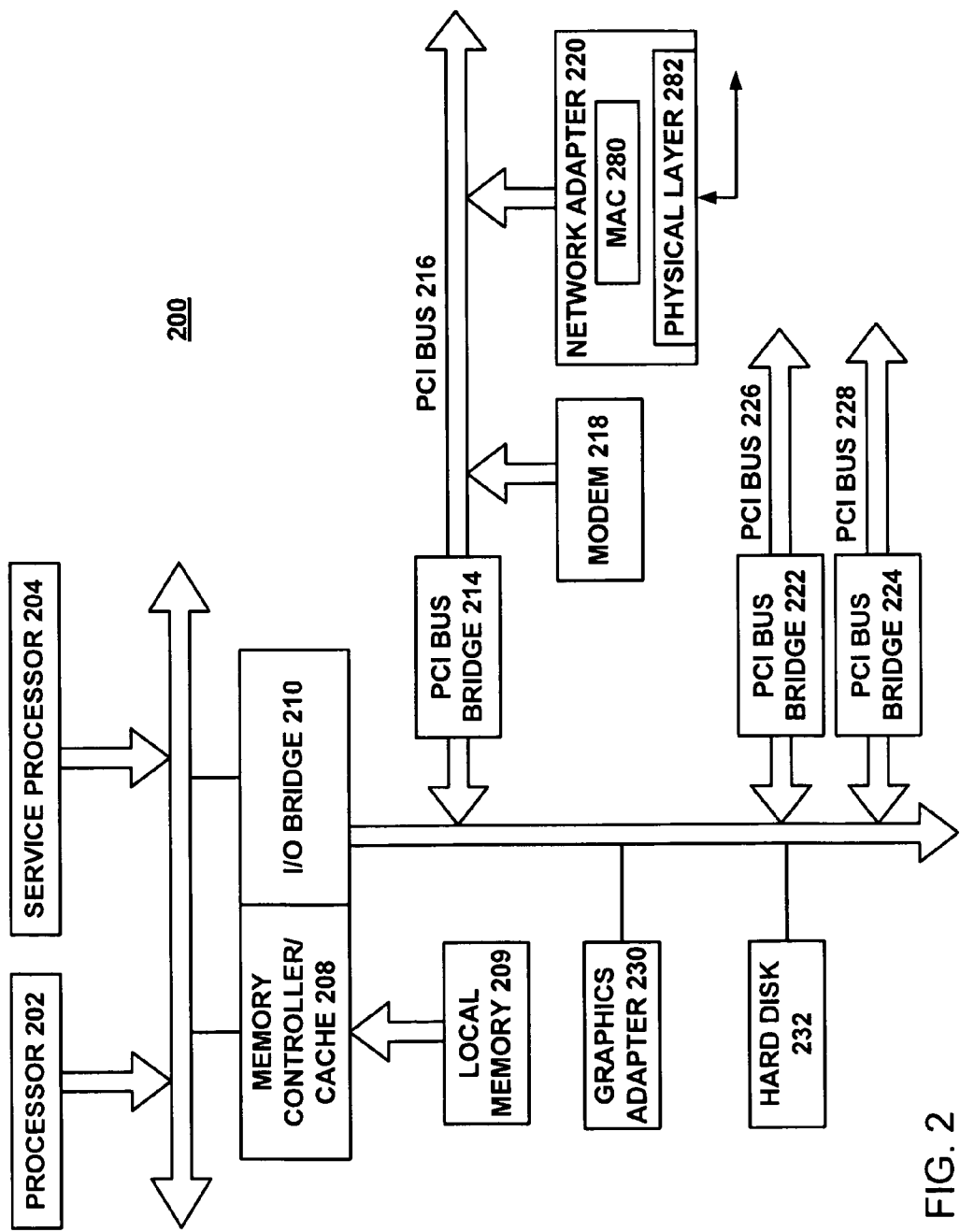
FIG. 2 is a more detailed illustration of a data processing system which could be used to implement one or more embodiments of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct07.pdf), which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.)

Figure 3:
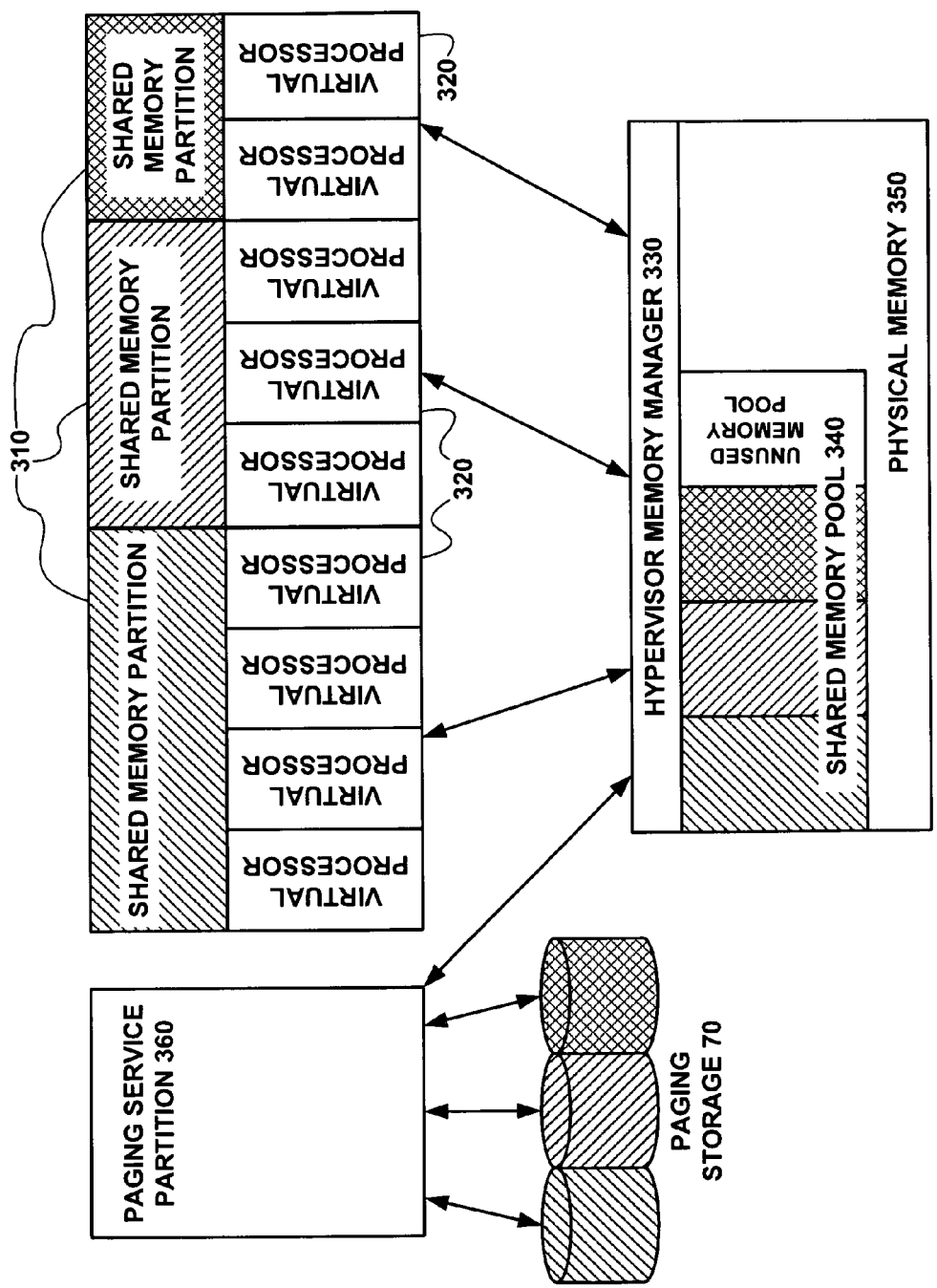
FIG. 3 illustrates a data processing system comprising multiple shared memory partitions employing a common (or shared) memory pool within physical memory of the data processing system, in accordance with an embodiment of the present invention.

FIG. 3 illustrates a data processing system, generally denoted 300. The shared memory partition data processing system 300 includes one or more shared memory partitions 310, each of which comprises one or more virtual processors 320, which interface through a hypervisor, and more particularly, a hypervisor memory manager 330, to a shared memory pool 340 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 340 is paged out by the hypervisor to a more abundant, less expensive storage (such as disk storage), via a paging service partition 360. Paging service partition 360 is an enhanced virtual input/output service (VIOS) partition configured to facilitate paging-out and paging-in of memory pages from or to, respectively, the shared memory pool. Also, although referred to as a shared memory partition, in reality, there is no sharing of memory per se, but rather sharing of the availability of a set amount of physical memory in the pool. Also, in other embodiments the functions of hypervisor memory manager 330 are integrated into the hypervisor 110.

Figure 4:
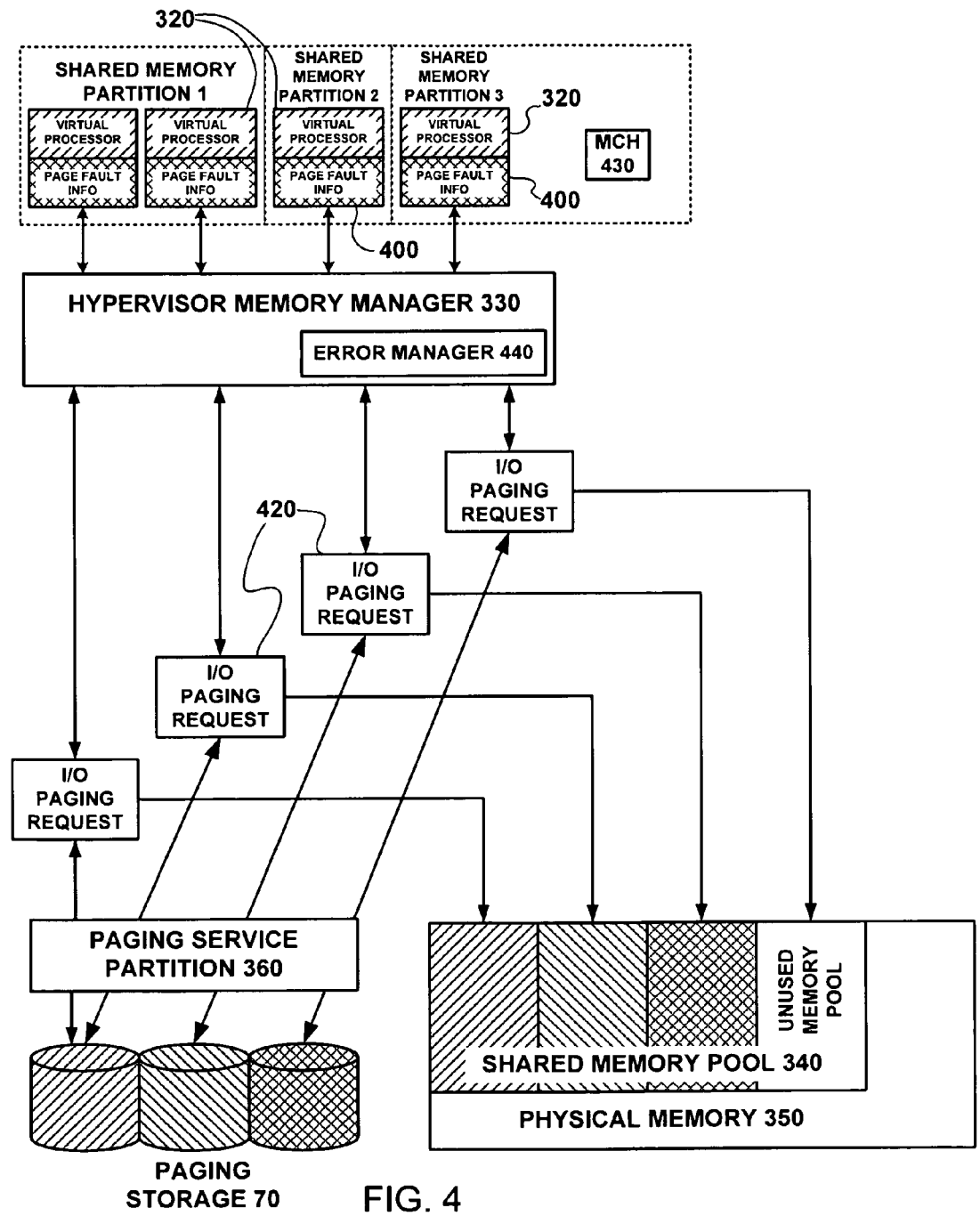
FIG. 4 illustrates an exemplary embodiment for handling hypervisor page faults within a shared memory partition data processing system, such as depicted in FIG. 3, in accordance with an embodiment of the present invention.

FIG. 4 illustrates an exemplary embodiment of handling hypervisor page faults within a shared memory partition data processing system such as described above in connection with FIG. 3. In this embodiment, three shared memory partitions 310; i.e., shared memory partition 1, shared memory partition 2 & shared memory partition 3, are illustrated, each comprising one or more virtual processors 320, and each encountering a hypervisor page fault 400. Each hypervisor page fault is responsive to a request by a virtual processor 320 for memory that is not resident in the shared memory pool 340 of physical memory 350. Responsive to this, the hypervisor memory manager 330 blocks the virtual processor 320 that issued the page access request (or otherwise blocks the request by a virtual processor 320 for memory that was not resident in the shared memory pool 340 of physical memory 350). The hypervisor memory manager 330 issues a page-in request to paging service partition 360 in order to move the requested page from paging service partition 360 to the shared memory pool 340 in order for the virtual processor 320 to utilize the requested page. Concurrent with requesting the needed page, the partition's virtual processor 320 encountering the hypervisor page fault is placed into a wait state. As explained further below, logic is provided herein for handling I/O paging errors when attempting to service page-in requests to the external storage entity responsive to hypervisor page faults encountered by one or more virtual processors of one or more shared memory partitions of the shared memory partition data processing system.

In certain embodiments, hypervisor 110 or hypervisor memory manager 330 may include an error manager 440. In other embodiments the function of error manager 440 are integrated into hypervisor 110. Upon receipt of an error or fault notice, error manager 440 classifies the type of error and may instruct the hypervisor 110 to take further action depending on the error type, such as conveying error recovery instructions. In other embodiments the error or fault notice may include the error type and the error manager 440 need not classify the error.

In a certain embodiment, error manager 440 may receive an uncorrectable memory error notification or an I/O paging error notification. When the error manager 440 receives notice of an uncorrectable memory error, the shared memory partition is notified and error recovery procedures ensue. When the error manager 440 receives notice of an I/O paging error, the error manager 440 modifies the I/O paging error notification to the shared memory partition. For instance, instead of the hypervisor sending the shared memory partition a machine check interrupt response in the case of an uncorrectable memory error, the hypervisor may send a simulated machine check interrupt response to the shared memory partition in the case of an I/O paging error. The shared memory partition is then able to utilize the uncorrectable memory error recovery procedures for I/O paging error recovery. The error manager 440 maps error recovery procedures used for a first type of error as those procedures to be used for a second type of error. In other words, a new interface between the hypervisor and the shared memory partition is not necessary to handle I/O paging errors. The simulated machine check response methodology may be utilized whenever the hypervisor will page into or page from a mass storage device that can itself incur an error.

Figure 5:
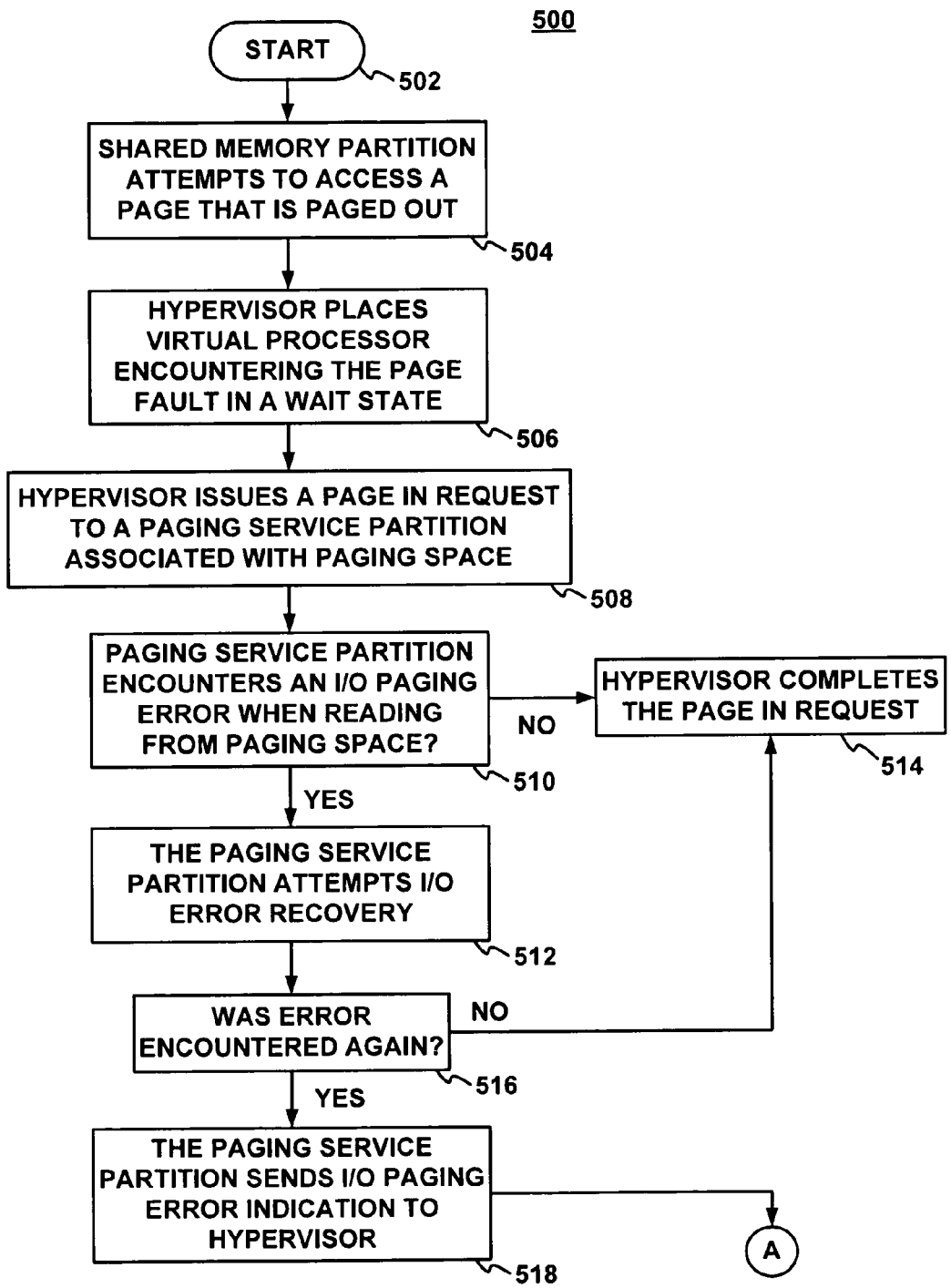
FIG. 5 illustrates logic for handling hypervisor I/O paging errors faults when a virtual processor in a shared memory partition attempts to access a page within a shared memory partition data processing system, in accordance with an embodiment of the present invention.

FIG. 5 illustrates logic for handling hypervisor I/O paging errors when a virtual processor in a shared memory partition attempts to access a page within a shared memory partition data processing system, in accordance with an embodiment of the present invention. The logic of handling hypervisor page faults 500 is mainly focused upon interactions between hypervisor memory manager 330 and paging service partition 360, and begins at block 502. A shared memory partition or associated virtual processor 320 attempts to access memory that is not resident in the shared memory pool 340 of physical memory 350 (block 504). Hypervisor memory manager 330 places the virtual processor encountering the page fault in a wait state (block 506). Hypervisor memory manager 330 issues a page-in request to paging service partition 360 in order to move the requested page from paging service partition 360 to the shared memory pool 340, in order for the virtual processor 320 to utilize the requested page (block 508). It is determined whether paging service partition 360 encounters an I/O error when reading from the paging space (e.g., paging storage 70, etc.) or when otherwise attempting the page-in request (block 510). If the paging service partition 360 does not encounter an I/O error when reading from the paging space, hypervisor memory manager 330 completes the page-in request (block 514). If the paging service partition 360 does encounter an I/O paging error when reading from the paging space, the paging service partition 360 attempts I/O error recovery (block 512). I/O error recovery procedures may be for instance, retry of the operation, resetting the device and retrying the operation, etc. It is then determined if the similar, or another, I/O error was encountered by paging service partition 360 when reading from the paging space (block 516). If the paging service partition 360 does not encounter an I/O error when reading from the paging space, hypervisor memory manager 330 completes the page-in request (block 514). If the paging service partition 360 does encounter an I/O error when reading from the paging space, the paging service partition 360 sends a paging failure indication to hypervisor memory manager 330 (block 518).

Figure 6A:
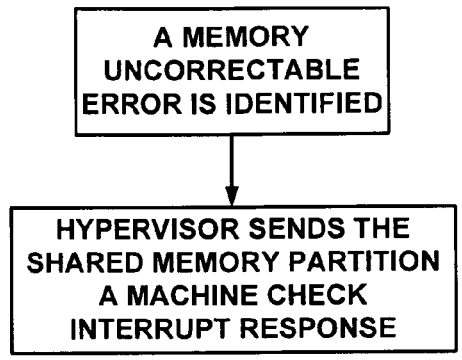
FIG. 6A illustrates prior art logic for handling memory uncorrectable errors.
Figure 6B:
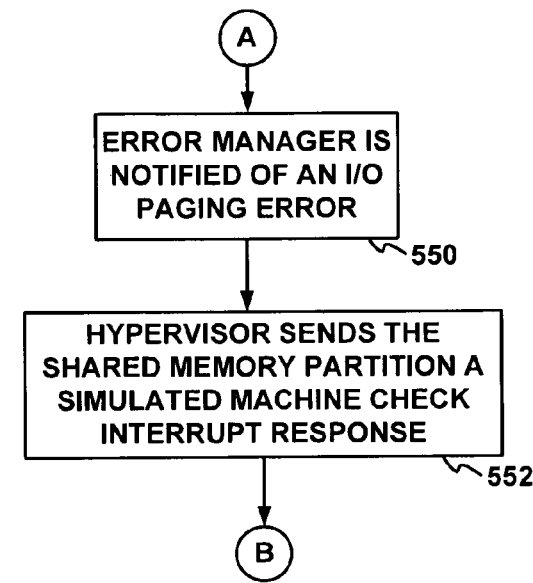
FIG. 6B illustrates logic for handling hypervisor I/O paging errors, in accordance with an embodiment of the present invention.

FIG. 6A illustrates prior art logic for handling memory uncorrectable errors. An unrecoverable memory error is identified and the hypervisor sends the shared memory partition associated with the uncorrectable error a machine check interrupt response. FIG. 6B illustrates logic for handling hypervisor I/O paging errors, in accordance with an embodiment of the present invention. Responsive to the paging service partition 360 sending a paging failure indication to hypervisor memory manager, the error manager is effectively notified of an I/O paging error (block 550). The hypervisor memory manager 330 sends the shared memory partition associated with the I/O paging error a simulated machine check interrupt response (block 552). A simulated machine check interrupt response is not a genuine machine check initiated by a hardware interrupt. In a simulated machine check the hypervisor simulates the code path of a hardware interrupt by calling the hypervisor machine check code with the appropriate data to indicate for instance that, an unrecoverable memory error has occurred. In other words, a simulated machine check interrupt is propagated through the system as though it was a genuine hardware error but, in reality, is created by software to represent another error.

Figure 7:
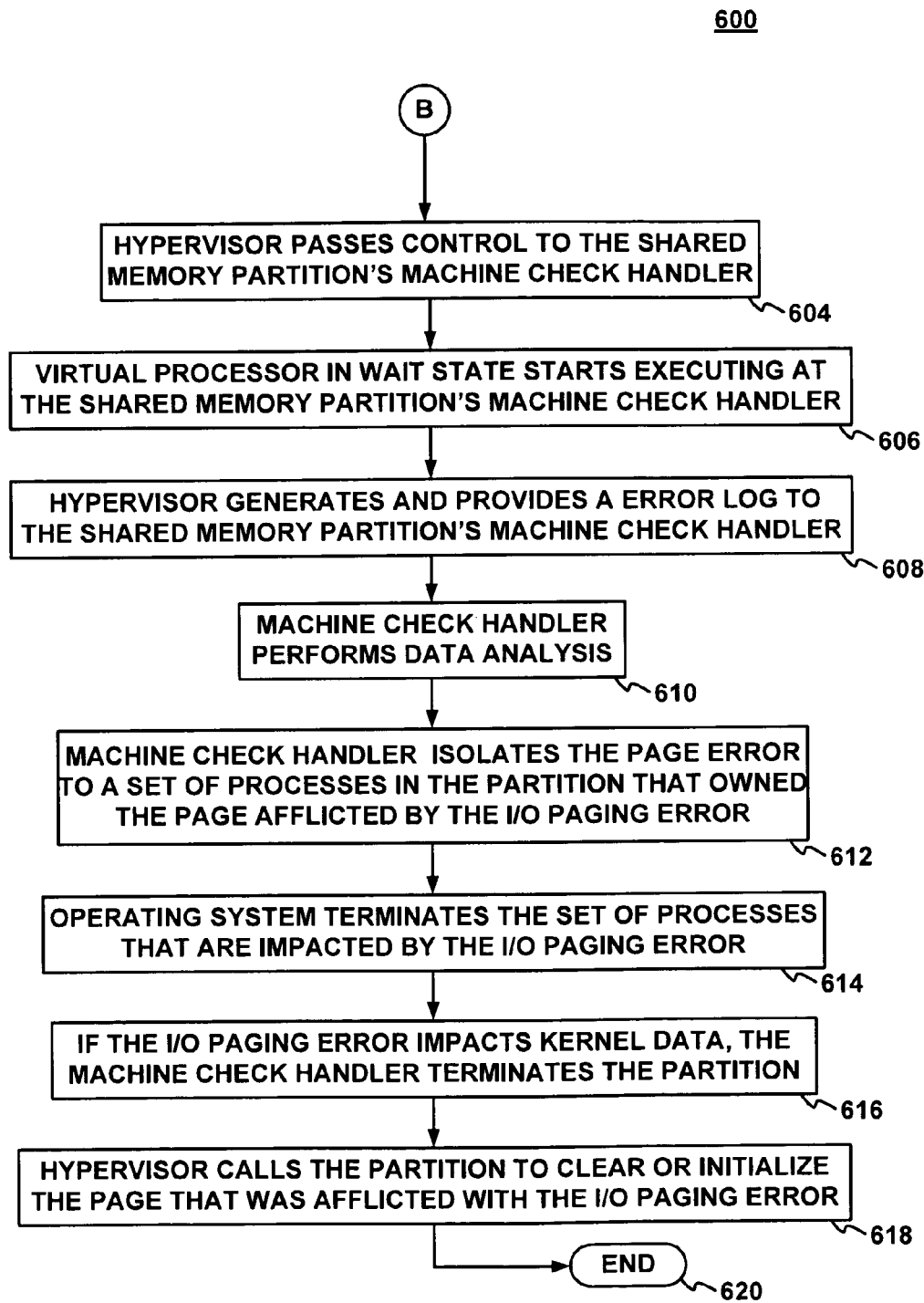
FIG. 7 illustrates logic for handling hypervisor I/O paging errors faults when a virtual processor in a shared memory partition attempts to access a page within a shared memory partition data processing system, in accordance with another embodiment of the present invention.

FIG. 7 illustrates logic for handling hypervisor I/O paging errors faults when a virtual processor in a shared memory partition attempts to access a page within a shared memory partition data processing system, in accordance with another embodiment of the present invention. The logic of handling hypervisor page faults 600 is generally focused upon interactions between hypervisor memory manager 330 and the shared memory partition that attempted to access memory that is not resident in the shared memory pool 340 of physical memory 350. The logic of handling hypervisor page faults 600 begins subsequent to the shared memory partition associated with the I/O paging error a simulated machine check interrupt response.

After the shared memory partition associated with the I/O paging error a simulated machine check interrupt response, hypervisor memory manager 330 passes control to the shared memory partition's machine check handler 430 (block 604). A machine check handler is software that is called to handle the error that instigated a machine check interrupt. There is a machine check handler in the hypervisor which receives control initially and subsequently passes control and data to the shared memory partition machine check handler 430 for final processing of the error.

The virtual processor encountering the page fault in a wait state begins executing at machine check handler 430 (block 606). In other words the machine check handler 130 processes the error presented by the machine check interrupt. Hypervisor memory manager 330 generates and provides an error log to machine check handler 430 (block 608). The error log provides data to machine check handler 430 for its analysis. The error log may for example indicate to the shared memory partition that the contents of the entire page are lost, or that a clearing instruction will not clear the I/O paging error. A clearing instruction will zero a cache line without first fetching the contents from the memory. A clearing instruction will clear a memory error by setting the contents of the cache line to zero. Machine check handler 430 performs data analysis utilizing the error log (block 610). The logical address of the page associated with the I/O paging error may be provided by the hypervisor to aid the machine check handler in its analysis. The Machine check handler 430 attempts to isolate the page error to a process or a set of processes in the partition which owned the page afflicted with the page error (block 612). The operating system of the shared memory partition associated with the I/O paging error terminates the process or set of processes that are impacted by the I/O paging error (block 614). If the I/O paging error impacts kernel data, machine check handler 430 terminates the partition (block 616). Hypervisor memory manager 330 calls the shared memory partition to clear or initialize the page afflicted with the I/O paging error (block 618). The logic of handling hypervisor page faults 600 ends at block 620.

Figure 8:
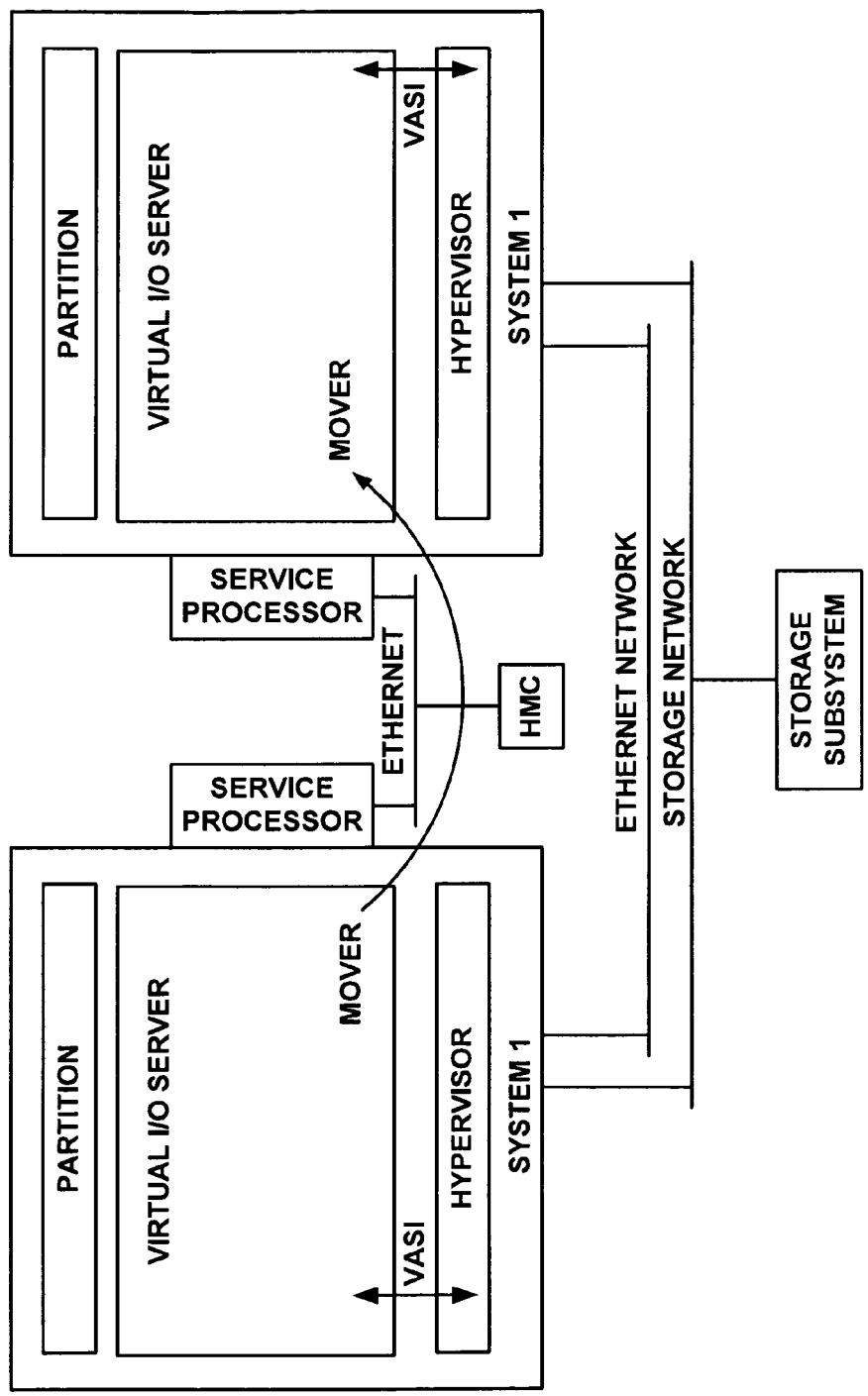
FIG. 8 illustrates shared memory partition mobility between multiple data processing systems such as system described above in connection with FIG. 3, in accordance with another embodiment of the present invention.

FIG. 8 illustrates an exemplary embodiment of handling hypervisor page faults created during partition mobility between multiple shared memory partition data processing systems such as described above in connection with FIG. 3. Active partition mobility is the actual movement of a running partition from one physical data processing system to another with minimal or no disruption of the operating system and applications running in the partition. Active partition mobility may be utilized to consolidate or balance workload or planned or impending data processing system outages. Inactive partition mobility transfers a partition that is logically powered off from one system to another.

Active migration typically involves the following steps: The hardware management console (HMC) creates a compatible partition shell on the target system. The HMC configures the mover service partition on the source and target systems. The HMC issues a prepare for migration event to the source operating system. The HMC creates the necessary virtual SCSI devices in the target systems VIOSs. The source mover starts sending partition state to the target mover. Once sufficient pages have moved, the hypervisor suspends the source partition. During the suspension, the source mover partition continues to send partition state information. The mobile partition resumes execution on the destination server. The destination partition retries all pending I/O requests that were not completed. When the destination mover partition receives the last memory page the migration is complete.

An I/O paging error may occur when a shared memory partition is migrated between two systems. This may occur for example while the shared memory partition of the source system attempted to page-in logical memory after the shared memory partition was resumed on the target system. It may be desirable to transform the I/O paging error on the source system into a simulated machine check interrupt to the shared memory partition executing on the target system. It is possible that the shared memory partition may be migrated a second time, perhaps to a third data processing system, before it has accessed the page associated with the I/O paging error during the first migration. The list of the page or pages associated with the I/O paging error during the first migration may also be migrated during the second migration for use in future error recovery processes.

Figure 9:
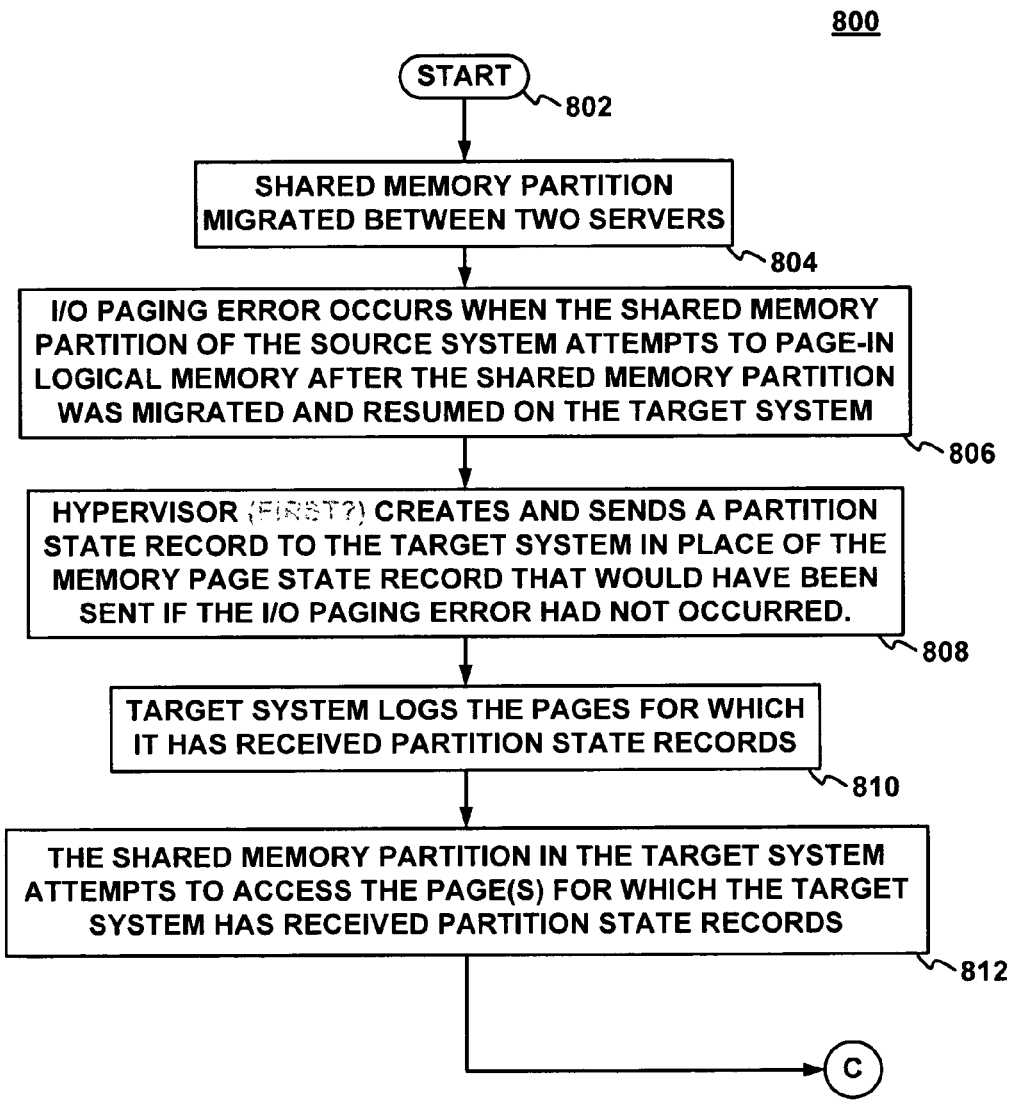
FIG. 9 illustrates logic for handling hypervisor I/O paging errors faults when a virtual processor in a shared memory partition attempts to access a page during shared memory partition migration between data processing systems, in accordance with another embodiment of the present invention.

FIG. 9 illustrates another embodiment of logic for handling hypervisor page faults during shared memory partition migration between data processing systems such as described above in connection with FIG. 3. The logic of handling hypervisor page faults 800 begins at block 802. A shared memory partition migration occurs between two data processing systems (block 804). An I/O paging error occurs (block 806). An I/O paging error may occur for instance when the shared memory partition of the source system attempts to page-in logical memory after the shared memory partition was resumed on the target system. An I/O paging error in a shared partition memory migration may occur in other instances as well. The hypervisor memory manager of the source system creates and sends a partition state record to the target system (block 808). The partition state record sent to the target system is in place of the page state record that would typically been sent had the I/O paging error not occurred. The target system logs the pages for which it has received partition state records (block 810). The shared memory partition in the target system attempts to access the page(s) associated with the I/O paging error and/or for which the target system has received partition state records (bock 812).

Figure 10:
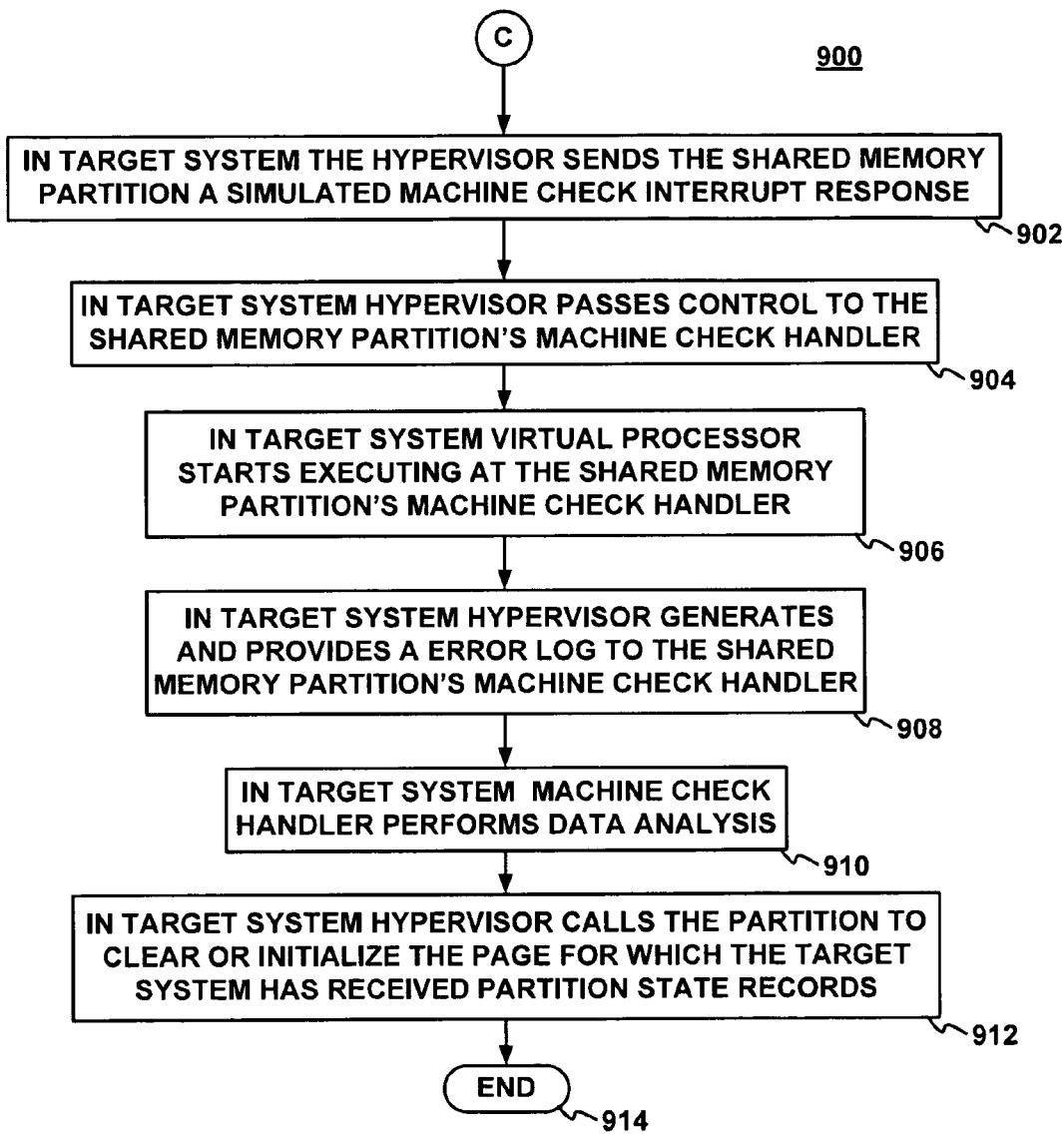
FIG. 10 illustrates logic for handling hypervisor I/O paging errors faults when a virtual processor in a shared memory partition attempts to access a page during shared memory partition migration between data processing systems, in accordance with another embodiment of the present invention.

FIG. 10 illustrates another embodiment of logic for handling hypervisor page faults during shared memory partition migration within a shared memory partition data processing system. The logic of handling hypervisor page faults 900 is mainly focused upon interactions between hypervisor memory manager 330 in the target system and the migrated shared memory partition that attempted to access a page for which the target system has received a partition state record. The logic of handling hypervisor page faults 900 begins subsequent to the shared memory partition in the target system attempting to access the page(s) associated with the I/O paging error and/or for which the target system has received partition state records.

The hypervisor memory manager 330 in the target system sends the shared memory partition in the target system attempting to access the page(s) associated with the I/O paging error and/or for which the target system has received partition state records a simulated machine check interrupt response (block 902). The hypervisor memory manager 330 in the target system passes control to the shared memory partition's machine check handler 430 (block 904). The virtual processor in the shared memory partition in the target system begins executing at machine check handler 430 (block 906). Hypervisor memory manager 330 in the target system generates and provides an error log to machine check handler 430 (block 908). The machine check handler in the target system performs data analysis (block 910). The hypervisor memory manager 330 in the target system calls the shared memory partition to clear or initialize the page that was afflicted with the I/O paging error or the page for which the target system had received the partition state record (block 912). The logic of handling hypervisor page faults 900 ends at block 914.

Further details on shared memory partition data processing systems are provided in the following patent applications, the entirety of each of which is hereby incorporated herein by reference: "Hypervisor-Based Facility for Communicating Between a Hardware Management Console and a Logical Partition", U.S. Ser. No. 12/403,402; "Managing Assignment of Partition Services to Virtual Input/Output Adapters", U.S. Ser. No. 12/403,416; "Automated Paging Device Management in a Shared Memory Partition Data Processing System", U.S. Ser. No. 12/403,426; "Dynamic Control of Partition Memory Affinity in a Shared Memory Partition Data Processing System", U.S. Ser. No. 12/403,440; "Transparent Hypervisor Pinning of Critical Memory Areas in a Shared Memory Partition Data Processing System", U.S. Ser. No. 12/403,447; "Shared Memory Partition Data Processing System with Hypervisor Managed Paging", U.S. Ser. No. 12/403,459; "Controlled Shut-Down of Partitions Within a Shared Memory Partition Data Processing System", U.S. Ser. No. 12/403,472; and "Managing Migration of a Shared Memory Logical Partition From a Source System to a Target System", U.S. Ser. No. 12/403,485.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 11:
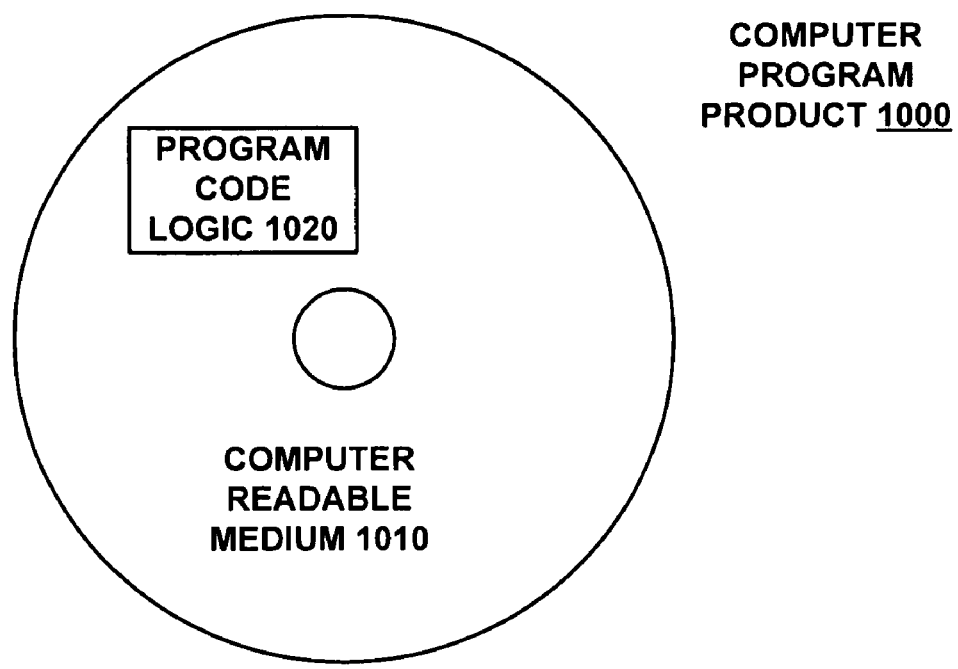
FIG. 11 depicts one embodiment of a computer program product incorporating one or more aspects of the present invention.

One example of an article of manufacture or a computer program product incorporating one or more aspects of the present invention is described with reference to FIG. 11. A computer program product 1000 includes, for instance, one or more computer readable medium 1010 to store computer readable program code means or logic 1020 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing a virtual processor in a shared memory partition attempting to access a page, the method comprising:

responsive to a paging service partition encountering an I/O paging error when attempting to read from a paging space, sending a paging failure indication to a hypervisor that is connected to the shared memory partition associated with the I/O paging error and to the paging service partition;

sending a simulated machine check interrupt instruction from the hypervisor to the shared memory partition;

responsive to the virtual processor attempting to access a page that is paged-out, placing the virtual processor in a wait state; and responsive to a machine check handler associated with the shared memory partition obtaining control, allowing the virtual processor in the wait state to begin executing at the machine check handler.

2. The method of claim 1, further comprising:

generating and providing an error log from the hypervisor to the machine check handler.

3. The method of claim 2, further comprising:

responsive to the machine check handler performing data analysis utilizing the error log, isolating the I/O paging error to a process or a set of processes in the shared memory partition associated with the I/O paging error.

4. The method of claim 3, further comprising:

terminating the process or set of processes in the shared memory partition associated with the I/O paging error.

5. The method of claim 3, further comprising:

terminating the shared memory partition if the I/O paging error impacts a kernel associated with the partition.

6. The method of claim 3 further comprising:

instructing the shared memory partition to clear or initialize the page associated with the I/O paging error.

7. A shared memory partition data processing system comprising:

a physical memory comprising a shared memory pool for at least one shared memory partition of the data processing system, the at least one shared memory partition comprising a plurality of virtual processors;

a processor supporting the plurality of virtual processors, the plurality of virtual processors sharing at least a portion of the shared memory pool of the physical memory of the data processing system;

a hypervisor that connects the shared memory partition to at least the shared memory pool and to the paging space;

a paging service partition that facilitates paging-in of memory pages from the paging space to the shared memory pool;

wherein the hypervisor memory manager, responsive to the paging service partition encountering an I/O paging error when attempting to read from the paging space, receives a paging failure indication from the paging service partition, and wherein the hypervisor memory manager sends a simulated machine check interrupt instruction to the shared memory partition, and wherein the virtual processor is placed in a wait state subsequent to the virtual processor attempting to access a page that is paged-out; and a machine check handler associated with the shared memory partition, wherein the virtual processor in the wait state is allowed to execute at the machine check handler.

8. The shared memory partition data processing system of claim 7, wherein the hypervisor memory manager generates and provides an error log to the machine check handler.

9. The shared memory partition data processing system of claim 8, wherein the machine check handler analyzes the data log to isolate the I/O paging error to a process or a set of processes in the shared memory partition associated with the I/O paging error.

10. The shared memory partition data processing system of claim 9, wherein the hypervisor memory manager terminates the process or set of processes associated with the I/O paging error.

11. The shared memory partition data processing system of claim 10, wherein the shared memory partition clears or initializes the page associated with the I/O paging error.

12. An article of manufacture comprising:

at least one non-transitory computer-readable storage medium having computer-readable program code logic to address a hypervisor page fault in a shared memory partition data processing system, the computer-readable program code logic when executing on a processor performs:

responsive to a paging service partition encountering an I/O paging error when attempting to read from a paging space, sending a paging failure indication to a hypervisor that is connected to a shared memory partition and to a paging service partition:

sending a simulated machine check interrupt instruction from the hypervisor to the shared memory partition;

responsive to the virtual processor attempting to access apage that is paged-out, placing the virtual processor in a wait state; and responsive to a machine check handler associated with the shared memory partition obtaining control, allowing the virtual processor in the wait state to begin executing at the machine check handler.

13. The article of manufacture of claim 12, wherein the computer-readable program code logic when executing on the processor further performs:

instructing the shared memory partition to clear or initialize the page associated with the I/O paging error.

14. A method for managing paging I/O errors during hypervisor page fault processing comprising:

in response to a hypervisor page fault in requesting memory that is not resident in a shared memory pool, sending an I/O paging request to an external storage paging space;

in response to a paging service partition encountering an I/O paging error, sending a paging failure indication a hypervisor;

sending a simulated machine check interrupt instruction from the hypervisor to the shared memory partition;

transferring control to a machine check handler associated with the shared memory partition;

performing data analysis at the machine check handler utilizing an error log to attempt to isolate the I/O paging error to a process or a set of processes in the shared memory partition;

terminating the process or set of processes associated with the I/O paging error; and clearing or initializing the page associated with the I/O paging error.

* * * * *